United States Patent
Kawai

[11] Patent Number: 6,066,363
[45] Date of Patent: *May 23, 2000

[54] METHOD FOR FORMING A COATING OF GLASS OVER A CERAMIC

[75] Inventor: Takashi Kawai, Tokyo, Japan

[73] Assignee: Kabushiki Kaisha SSC, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,220

[22] Filed: Jul. 2, 1997

[51] Int. Cl.⁷ .................... B05D 3/02; B05D 1/36
[52] U.S. Cl. ............ 427/193; 427/197; 427/199; 427/204; 427/269; 427/279; 427/287; 427/376.2
[58] Field of Search ............ 427/376.2, 397.7, 427/269, 279, 287, 193, 197, 199, 204

[56] References Cited

U.S. PATENT DOCUMENTS

| | | | |
|---|---|---|---|
| 3,308,525 | 3/1967 | Tsuji et al. | 427/193 |
| 3,956,558 | 5/1976 | Blanco et al. | 428/204 |
| 4,059,423 | 11/1977 | De Vos et al. | 65/21 |
| 4,291,635 | 9/1981 | Nelson | 110/245 |
| 4,805,551 | 2/1989 | Marazzi | 118/64 |
| 4,957,779 | 9/1990 | Irick, Jr. et al. | 427/103 |
| 5,034,358 | 7/1991 | MacMillan | 501/106 |
| 5,176,961 | 1/1993 | Crooker et al. | 428/409 |
| 5,300,324 | 4/1994 | Croft et al. | 427/376.2 |
| 5,626,923 | 5/1997 | Fitzgibbons et al. | 427/535 |

*Primary Examiner*—Shrive Beck
*Assistant Examiner*—Michael Barr
*Attorney, Agent, or Firm*—Birch, Stewart, Kolasch & Birch, LLP

[57] ABSTRACT

A method for forming a coating of glass over a surface of a basis material, clay body, of a ceramic such as pottery, earthen ware, porcelain and stoneware instead of a conventional glaze coating. Glass grains are attached to the basis material surface of the ceramic and thereafter the glass grains are heated to be melted and form a coating of glass over the basis material. Glass grains can be attached to the basis material directly or by way of a glaze, water glass or adhesive. Further, the glass grains may be attached to the basis material by way of static electricity.

5 Claims, 3 Drawing Sheets

METHOD FOR FORMING A COATING OF GLASS OVER A CERAMIC

BACKGROUND OF THE INVENTION

1. Field of the Invention

This invention relates to a method for forming a coating of glass over a surface of a basis material of a ceramic such as pottery, earthen ware, porcelain and stoneware instead of a conventional glaze coating.

2. Prior Art

Heretofore, glazes have been applied to surfaces of basis materials, clay bodies, of ceramic wares and then the ceramic wares have been baked in a kiln so that glaze coatings will be formed over the surfaces of basis materials. With such method, results of the glaze coating formation such as coloring, luster, texture, and transparency thereof, and presence of deficiencies have been unpredictable, since they have varied with subtle changes of various conditions such as compositions of glazes and basis materials, baking temperature and cooling rate. Accordingly, it has been not easy to stably obtain satisfactory results.

SUMMARY OF THE INVENTION

It is a principal object of the present invention to provide a method for forming a coating of glass over a ceramic that can easily and stably obtain satisfactory results.

According to the present invention, glass grains are attached to a surface of a basis material, clay body, of a ceramic and thereafter the glass grains are heated to be melted and form a coating of glass over the basis material.

Since the coating of glass is formed over the surface of the basis material of the ceramic, instead of a conventional glaze coating, by heating and melting the glass grains attached to the basis material, satisfactory results can easily and stably obtained.

Though the glass grains may be attached to the basis material of ceramic directly, the glass grains can be attached to the basis material more satisfactorily by way of a glaze, water glass or adhesive. Further, the glass grains may be attached to the basis material by way of static electricity.

Even when a coating of glass is formed over a basis material surface of a ceramic in accordance with the present invention, painting can be made over the basis material surface, under or over the glass coating, as in case a conventional glaze coating is formed. However, the glass coating can be formed over the basis material of the ceramic so as to exhibit desired patterns such as pictures, letters and figures in desired colors by attaching glass grains of appropriate colors to the basis material of the ceramic to form the desired patterns thereover. In this case, the glass grains can be attached to the basis material of the ceramic to form the desired patterns thereover by applying a glaze, water glass or adhesive over the basis material to form the desired patterns and then attaching the glass grains of selected colors to the applied glaze, water glass or adhesive.

Scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
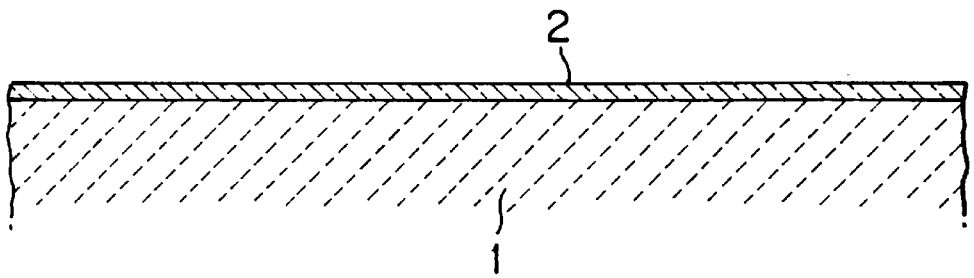
FIG. 1 is a schematic enlarged cross sectional view of a basis material of a ceramic with a glaze applied to a surface thereof in one embodiment of the present invention.

The present invention will hereunder be described in conjunction with preferred embodiments of the invention which are shown in the drawings.

Figure 2:
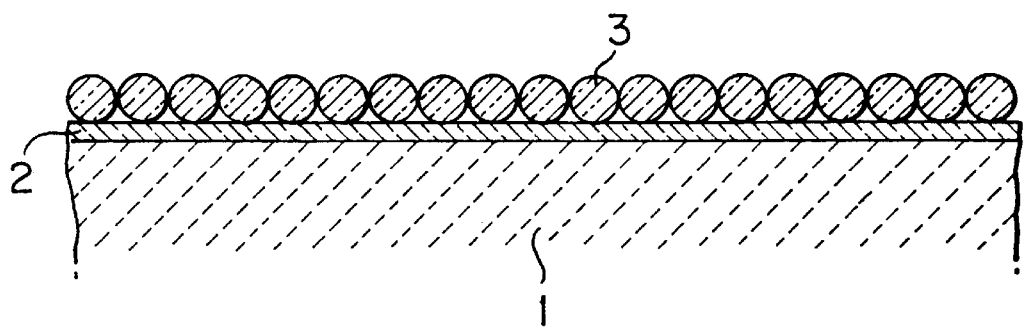
FIG. 2 is a schematic enlarged cross sectional view that is similar to FIG. 1, but shows glass grains as having been attached to the basis material surface by way of the glaze.
Figure 3:
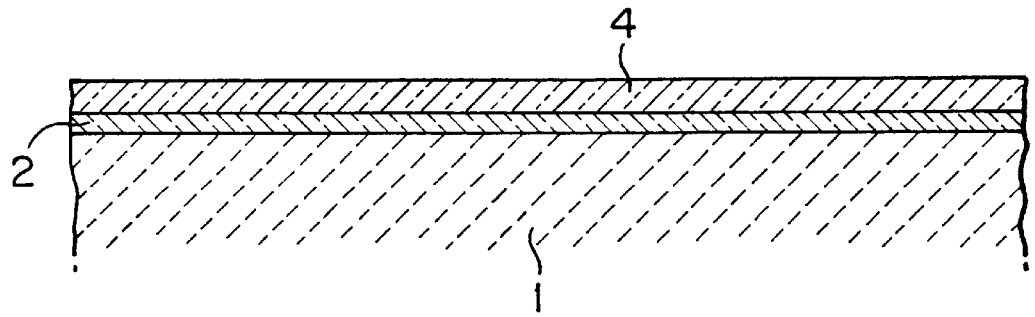
FIG. 3 is a schematic enlarged cross sectional view that is similar to FIG. 2, but further shows the glass grains have been melted by heat to form a coating of glass over the basis material surface.

FIGS. 1 through 3 schematically show one embodiment of the present invention. It should be noted that the sizes of glass grains 3 and the thicknesses of an adhesive 3 layer and a coating of glass 4 in these figures do not necessarily correspond to the actual ones of them. First, as shown in FIG. 1, a glaze 2 is applied to a surface of a basis material 1, clay body, of a ceramic. The basis material 1 may be a raw clay or a biscuit. Also, the basis material 1 may have been painted or not painted prior to the application of the glaze 2. In case the basis material 1 has been painted prior to the application of the glaze 2, preferably the glaze 2 has higher transparency.

Next, as shown in FIG. 2, glass grains 3 are attached to the basis material 1 surface by way of the glaze 2. Though the glass grains 3 may be angular ones, preferably they are roundish ones such as glass beads, because they can be handled with bare hands with safety. Thereafter the basis material 1 with the glass grains 3 attached thereto by way of the glaze 2 is heated in a kiln (not shown in the drawings) so that the glass grains 3 will be melted. Then, as shown in FIG. 3, a coating of glass 4 which is similar to a conventional glaze coating is formed over the basis material 1. Since glazes generally have excellent heat-resistant property, the glass grains 5 are well prevented from falling off of the basis material 1.

If a glaze which will become transparent after baking, is used as the glaze 2, the formation of the glass coating 4 does not have a bad influence on coloring of the ceramic. Also, glazes which are opaque even after baking also may be used to exhibit a combination color of those of the glazes and glass coating 4.

As previously stated, even when the glass coating is formed over the basis material surface of the ceramic in accordance with the present invention, painting can be made over the basis material surface, under or over the glass coating, as in case a conventional glaze coating is formed. However, the glass coating can be formed over the basis material of ceramic to exhibit desired patterns such as pictures, letters and figures in desired colors by attaching glass grains of appropriate colors to the basis material 1 surface of ceramic to form the desired patterns thereover. FIGS. 4 through 9 show a second embodiment of the present invention where desired patterns are thus formed by glass grains.

Figure 4:
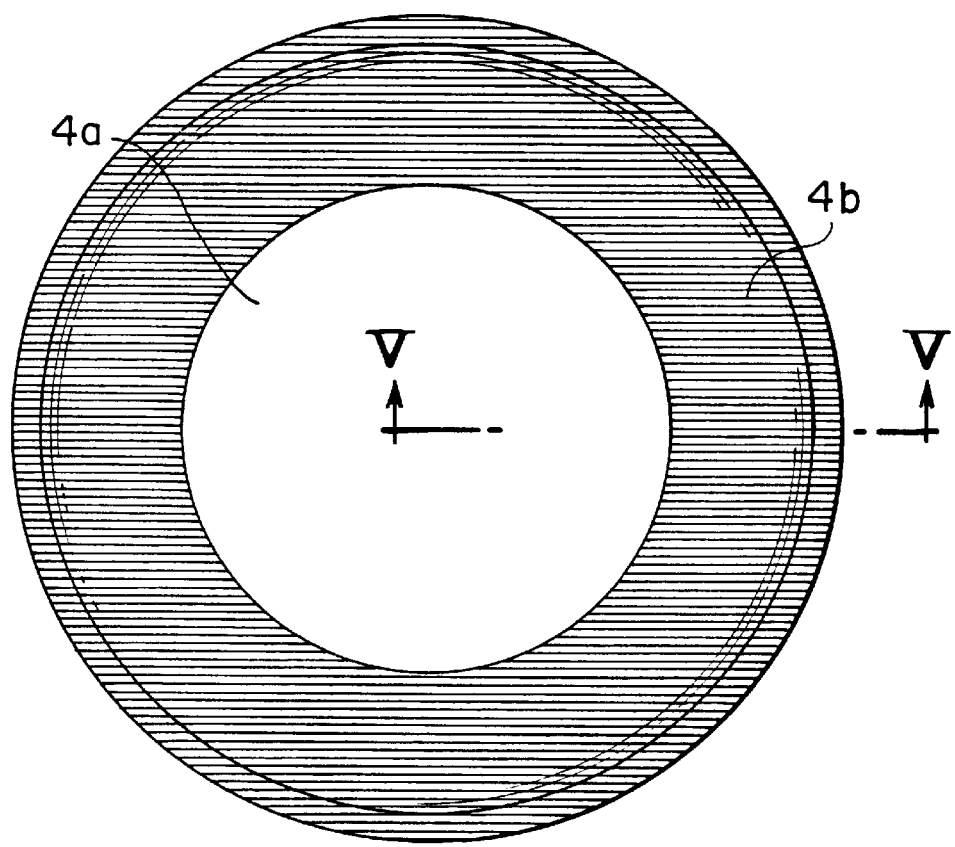
FIG. 4 is a plan view of a ceramic with the basis material thereof coated with a coating of glass in a second embodiment of the present invention.
Figure 5:
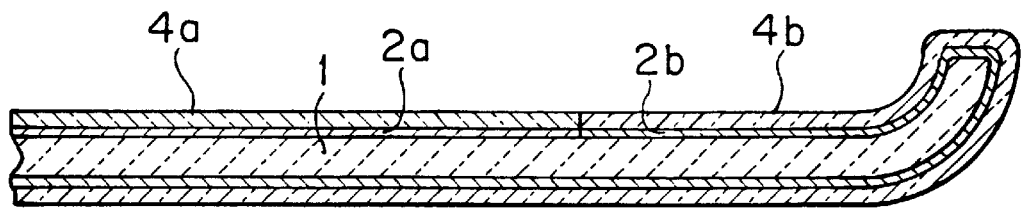
FIG. 5 is an enlarged sectional view of the ceramic of FIG. 4 taken along the line V—V of FIG. 1.

FIGS. 4 and 5 show a finished ceramic ware where a glass coating of a first color (e.g. white) 4*a* is formed in a round shape on the central part of the top face of the basis material 1 of the ceramic while a glass coating of a second color (e.g. blue) 4*b* is formed on the rest of the surface of the basis material 1.

Figure 6:
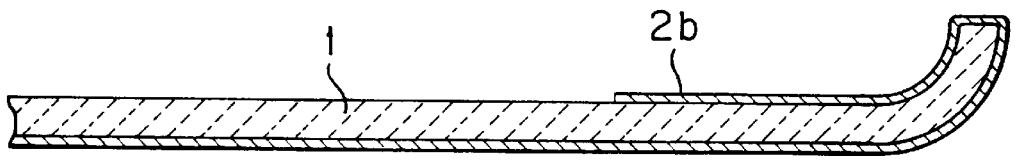
FIG. 6 is a schematic enlarged cross sectional view of the basis material with a glaze for a second color glass grains applied to a surface thereof in the second embodiment of the present invention.
Figure 7:
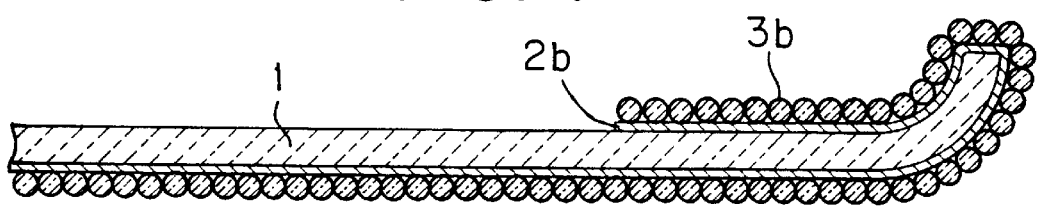
FIG. 7 is a schematic enlarged cross sectional view that is similar to FIG. 6, but shows the second color glass grains as having been attached to the basis material surface by way of the glaze for the second color glass grains.
Figure 8:
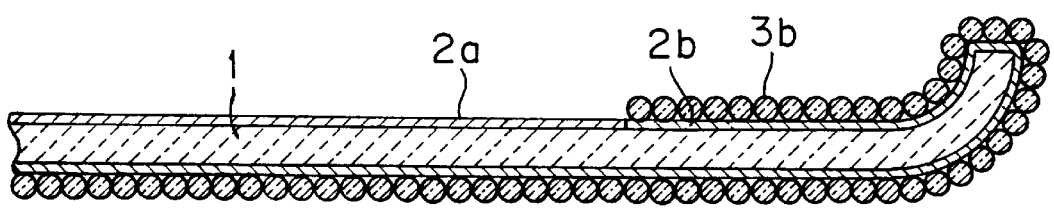
FIG. 8 is a schematic enlarged cross sectional view that is similar to FIG. 7, but further shows a glaze for a first color glass grains as having been applied to the basis material surface.
Figure 9:
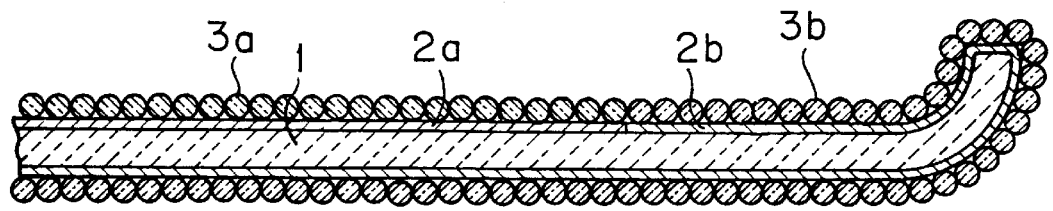
FIG. 9 is a schematic enlarged cross sectional view that is similar to FIG. 8, but further shows the first color glass grains as having been attached to the basis material surface by way of the glaze for the first color glass grains.

FIGS. 6 through 9 show the process of this embodiment. First, as shown in FIG. 6, a glaze 2*b* is applied to the part of the basis material 1 surface where the second color glass coating 4*b* should be formed and then, as shown in FIG. 7, glass grains of the second color 3*b* are attached to the glaze 2*b*. Next, a glaze 2*a*, which can be of the same kind as the glaze 2*b*, is applied to the part of the basis material 1 surface where the first color glass coating 4*a* should be formed and then, as shown in FIG. 9, glass grains of the first color 3*a* are attached to the glaze 2*a*. Thereafter the basis material 1 with the first and second color glass grains 3*a* and 3*b* attached thereto by way of glazes 2*a* and 2*b* is heated in a kiln (not shown in the drawings) so that the glass grains 3*a* and 3*b* will be melted. Then, as shown in FIGS. 4 and 5, the first color glass coating 4*a* is formed in a round shape on the central part of the top face of the basis material 1, while the second color glass coating 4*b* is formed on the rest of the basis material 1 surface.

Though in this embodiment the first and second color glass grains 3*a* and 3*b* layers do not overlap one another, a certain color glass grain layer may overlap another color glass grain layer in the present invention. For example, in the embodiment after the first color glass grains 3*a* are attached to the whole surface of the basis material 1, the second color glass grains 3*b* may be attached to the central part of the top face of the basis material 1.

Also, though in the embodiments shown herein a glaze is used to attach glass grains to a basis material of a ceramic, a water glass or a heat-resistant adhesive can be used instead of the glaze. Further, glass grains may be attached to a basis material of a ceramic by way of static electricity.

Although preferred embodiments of the present invention have been shown and described herein, it should be apparent that the present disclosure is made by way of example only and that variations thereto are possible within the scope of the disclosure without departing from the subject matter coming within the scope of the following claims and a reasonable equivalency thereof.

What is claimed is:

1. A method for forming a controlled pattern of a coating of glass over a ceramic comprising the steps of:

applying water glass to a surface of a basis material of ceramic to form a controlled pattern thereover, said controlled pattern being different from a pattern said surface of said basis material itself forms;

attaching glass grains to said water glass over said surface of said basis material to form said controlled pattern over said surface of said basis material;

heating said glass grains so that the glass grains melt and form a coating of glass over the basis material.

2. The method according to claim 1, wherein said glass grains are angular shaped.

3. The method according to claim 1, wherein said glass grains are roundish.

4. The method according to claim 1, wherein said glass grains are color glass grains.

5. The method according to claim 3, wherein said glass grains are glass beads.

* * * * *